United States Patent
Suzuki

(10) Patent No.: US 7,301,726 B1
(45) Date of Patent: Nov. 27, 2007

(54) BANDED LZT CSS ZONE

(75) Inventor: Shoji Suzuki, San Jose, CA (US)

(73) Assignee: Komag, Inc., San Jose, CA (US)

( * ) Notice: Subject to any disclaimer, the term of this patent is extended or adjusted under 35 U.S.C. 154(b) by 405 days.

(21) Appl. No.: 10/982,094

(22) Filed: Nov. 4, 2004

(51) Int. Cl.
*G11B 17/00* (2006.01)
*G11B 5/012* (2006.01)

(52) U.S. Cl. .............................. 360/97.01; 360/97.02; 360/97.03; 360/97.04

(58) Field of Classification Search .............. 360/97.01
See application file for complete search history.

(56) References Cited

U.S. PATENT DOCUMENTS

| | | | | |
|---|---|---|---|---|
| 4,664,963 | A * | 5/1987 | Sakai et al. .................. 428/172 |
| 4,819,100 | A * | 4/1989 | Asano ...................... 360/97.01 |
| 4,939,614 | A * | 7/1990 | Shirakura et al. ........... 360/135 |
| 4,996,622 | A * | 2/1991 | Takatsuki et al. ........... 360/135 |
| 5,062,021 | A * | 10/1991 | Ranjan et al. .............. 360/135 |
| 5,108,781 | A * | 4/1992 | Ranjan et al. .............. 427/556 |
| 5,144,512 | A * | 9/1992 | Ota et al. ................... 360/135 |
| 5,550,696 | A * | 8/1996 | Nguyen ....................... 360/135 |
| 5,586,040 | A * | 12/1996 | Baumgart et al. .......... 700/166 |
| 5,635,269 | A * | 6/1997 | Weir et al. ............... 428/848.1 |
| 5,729,399 | A * | 3/1998 | Albrecht et al. .............. 360/75 |
| 5,734,522 | A * | 3/1998 | Shrinkle .................. 360/235.4 |
| 5,801,908 | A * | 9/1998 | Akiyama et al. ......... 360/294.4 |
| 5,870,265 | A * | 2/1999 | Boutaghou .................. 360/135 |
| 5,905,606 | A | 5/1999 | Johnson et al. |
| 5,959,814 | A * | 9/1999 | Mallary et al. ............. 360/135 |
| 6,205,002 | B1 | 3/2001 | Baumgart et al. |
| 6,558,771 | B1 * | 5/2003 | Tang et al. .................. 428/141 |
| 6,884,526 | B1 * | 4/2005 | Tang et al. .............. 428/692.1 |
| 6,927,941 | B1 * | 8/2005 | Tanaka et al. .............. 360/135 |
| 6,969,989 | B1 * | 11/2005 | Mei ........................... 324/210 |

FOREIGN PATENT DOCUMENTS

| | | | | |
|---|---|---|---|---|
| JP | 54023508 | A | * | 2/1979 |
| JP | 05067321 | A | * | 3/1993 |
| JP | 10064055 | A | * | 3/1998 |
| JP | 10275330 | A | * | 10/1998 |
| JP | 2000057562 | A | * | 2/2000 |

* cited by examiner

*Primary Examiner*—Angel Castro
*Assistant Examiner*—Christopher R. Magee
(74) *Attorney, Agent, or Firm*—Blakely Sokoloff Taylor & Zafman LLP

(57) ABSTRACT

A magnetic recording disk having a non laser zone texturing (LZT) band in the contact-start-stop (CSS) zone. The width of the non-LZT band in the CSS zone may be greater than the width of a read and/or write element of a head and less than the width of a center pad on the head in order to prevent contact between the read and/or write element and the CSS zone's textured surface. The width of the non-LZT band may also be designed to account for head skew angle and positioning error due to movement of a suspension arm supporting the head.

30 Claims, 6 Drawing Sheets

BANDED LZT CSS ZONE

TECHNICAL FIELD

Embodiments of the invention relate to the field of disk drives and, in particular, to the magnetic recording disks and heads used in disk drives.

BACKGROUND

In current disk drive systems that employ flying heads, there is a protective film of air between the head and the disk, where no contact is intended to occur during head read/write operations. The read/write head element is typically a part of or affixed to a larger body that flies over the disk and is typically referred to as a "slider." The slider also includes a surface referred to as an air bearing surface (ABS). The ABS has aerodynamic effects such as compression or expansion of air to generate positive or sub-ambient pressure. The ABS may include a flat surface, step, cavity, pads, protrusions and/or taper. The ABS may also be referred to as a rail in the industry. The slider's body is attached to a suspension arm via a head gimbal assembly that biases the slider body towards the disk. The net effect of the ABS and the suspension arm is to cause the slider to fly at the desired height when the disk is at full speed, and to cause the slider to be in contact with the disk surfaced when the disk is at rest in a certain type of drive system known as a contact-start-stop (CSS) drive system.

A CSS drive system dedicates a portion of the disk's surface, referred to as the CSS zone, for the slider to reside when the drive is not in operation. With this type of system, the slider directly contacts the disk's surface in the CSS zone, typically on the aforementioned rail of the slider. Static friction or stiction is a term used to describe the force exerted against the motion of the slider relative to the disk surface when the slider is in contact with the disk surface in the CSS zone. The CSS zone is typically laser textured with bumps, referred to as laser zone texturing (LZT), in order to reduce such stiction. In laser texturing, a laser beam is focused to a small spot on the disk surface, forming uniformly shaped and sized features (a.k.a. laser bumps) in a controllable pattern. The laser bumps reduce the area of contact with the slider, thereby reducing the stiction behavior of the slider and disk surface interface. It should be mentioned that, in contrast to the requirements of CSS operation, for reading or writing operations it is desirable to have the surface of the disk be as smooth as possible to allow the head to fly as close as possible to the disk surface. Because of these differing requirements, it is known to use zone texturing where a portion of the disk used for CSS operation (the CSS zone) is textured more heavily than the portion of the disk used for data storage (the data zone).

As is well known, the slider undergoes sliding contact with a portion of the disk whenever the drive motor is turned on or off. One solution intended to further reduce friction when slider contacts occur in CSS drives is to texture the slider with multiple pads on the ABS of the slider (referred to as a padded head). Although such solutions may reduce the friction between the slider and disk surface in CSS drives, such solutions may not be able to completely prevent contact between a slider head element and the disk surface.

FIG. 1A shows a back (of a head) view illustrating a conventional interface with a padded head and a LZT CSS zone. Because the slider is supported by the air bearing, the slider changes the flying attitude from a flat to positive pitch angle as the air bearing develops during a startup operation. The inverse occurs as the air bearing diminishes during a shutdown operation. During these periods, the read/write head element may contact the laser bumps, as illustrated by FIG. 1B. Such contact can cause wear of carbon that covers the read/write element and may lead to head element degradation over time.

One conventional solution is to reduce the height of the laser texture bumps in the CSS zone. The duration of contact between the head and the laser bumps is determined by the fly height of the slider, the bump height, and the acceleration/deceleration of the spindle. The lower the bump height is made, the shorter the contact duration. However, because lower bumps produce higher stiction force due to a bigger contact area under the same padded head design, there is a practical limit to the height of the bumps. When reducing the height of the bumps, eventually, there will be no design window to avoid damage to the head element that falls within acceptable stiction margins.

Another solution discussed in U.S. Pat. No. 6,205,002 attempts to reduce the energy dissipated and, thus, the wear at the head-disk interface during drive operations when the slider is actually contacting the disk surface by modifying the topography of a portion of the CSS zone. U.S. Pat. No. 6,205,002 discuss dividing the CSS zone into three circular regions with a middle region having a topography which is different from the inner and outer zones. The height of the bumps in the middle region is reduced relative to the bump heights in the inner and outer regions, as illustrated in FIG. 1C, in order to reduce the energy dissipation between the head and the middle region during startup/shutdown while maintaining bump heights in the inner and outer regions to address stiction concerns. U.S. Pat. No. 6,205,002 further teaches that the width of the middle region should be larger than the width of the trailing rail or pad 23 in order to provide a particular advantage in inducing a positive pitch attitude to the slider to aid in early take off. More particular, if the width of the middle region is made wide enough to allow the trailing pad 23 to drop into the recessed middle region while the side rails 22 are resting on the higher bumped outer and inner zones, a positive pitching of the slider occurs. U.S. Pat. No. 6,205,002 further teaches that the positive pitch aids in compressing the air at the leading edge of the slider so that the slider will fly at a lower disk velocity than if the slider were sitting flat on the disk.

One problem with the configuration discussed in U.S. Pat. No. 6,205,002 is that by allowing the trailing pad 23 to drop into the recessed middle region, the head element that is disposed on the trailing pad can contact the middle region surface and, thereby, cause damage to the head element as discussed above. Another problem with the configuration discussed in U.S. Pat. No. 6,205,002 is that is does not take in account head positioning errors caused by head skew and suspension arm stop tolerances.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

The method and apparatus described herein may be implemented with a disk drive system having one or more disks. For example, the apparatus may be described and illustrated at times herein in relation to a single disk and a single head. It should be noted, however, that the method and apparatus are described and illustrated in relation to a single side of a single disk, and a single corresponding head, only for ease of explanation and is not meant to be limited only to small form factor drives, single-disk drives, single sided disks.

A magnetic recording disk having a lower bump texture height in a middle region of CSS zone (e.g., a non-LZT band) than bump texture heights in other regions (e.g., LZT textured) of the CSS zone is described. The width of the middle region in the CSS zone may be greater than the width of a read and/or write element of a head and less than the width of a center pad on the head in order to prevent contact between the read and/or write element and the CSS zone's surface. The width of the middle region may be designed to account for head skew and positioning error due to movement of a suspension arm supporting the head.

Figure 1A:
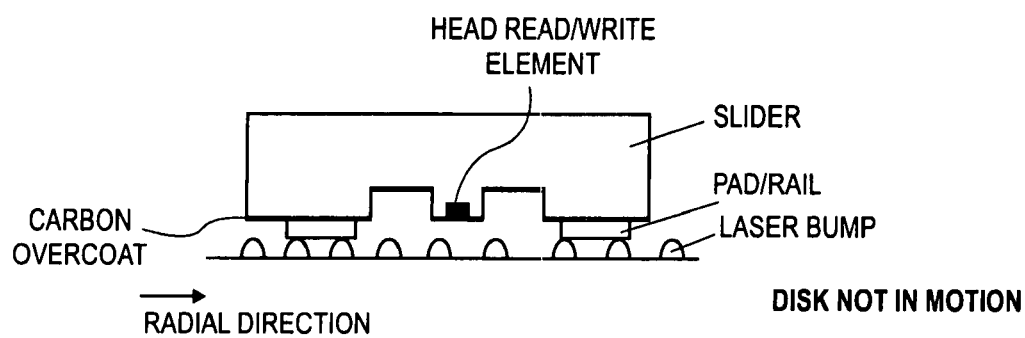
FIG. 1A shows a back view illustrating a conventional interface with a padded head and a LZT CSS zone.
Figure 1B:
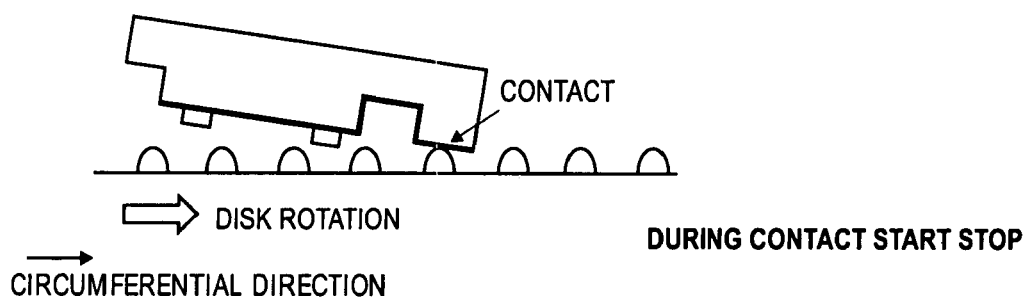
FIG. 1B illustrates a side view of the head of FIG. 1A during start/stop operations.
Figure 1C:
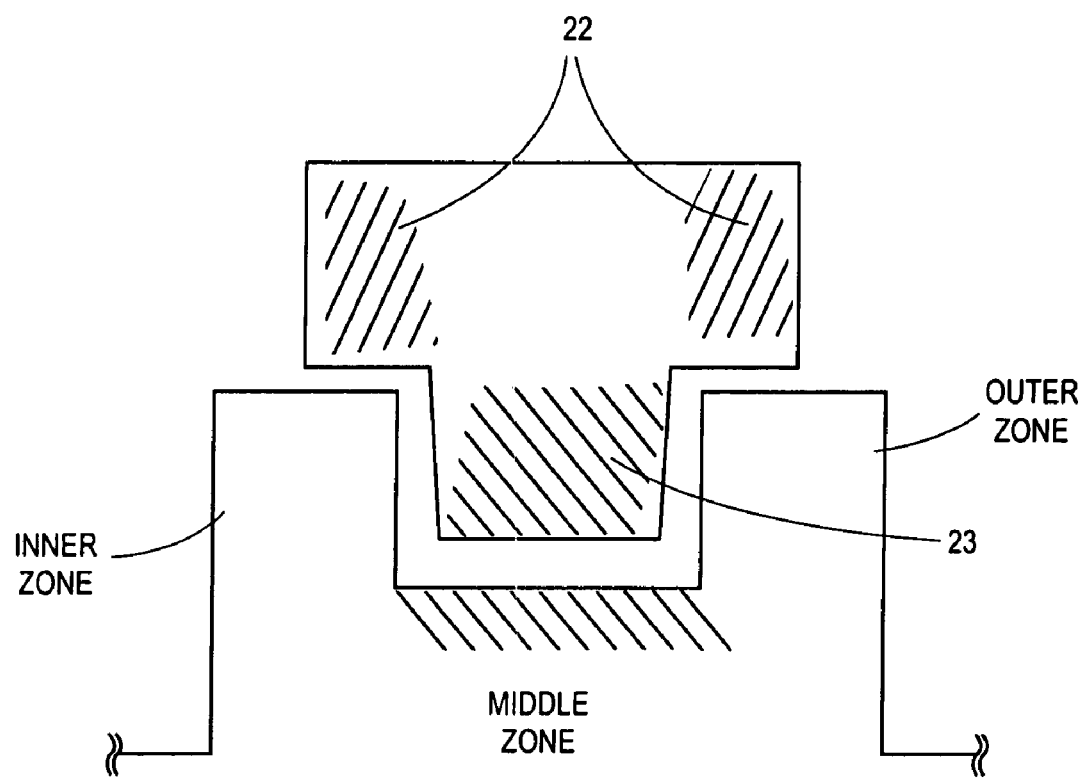
FIG. 1C illustrates a prior art disk drive configuration.
Figure 2:
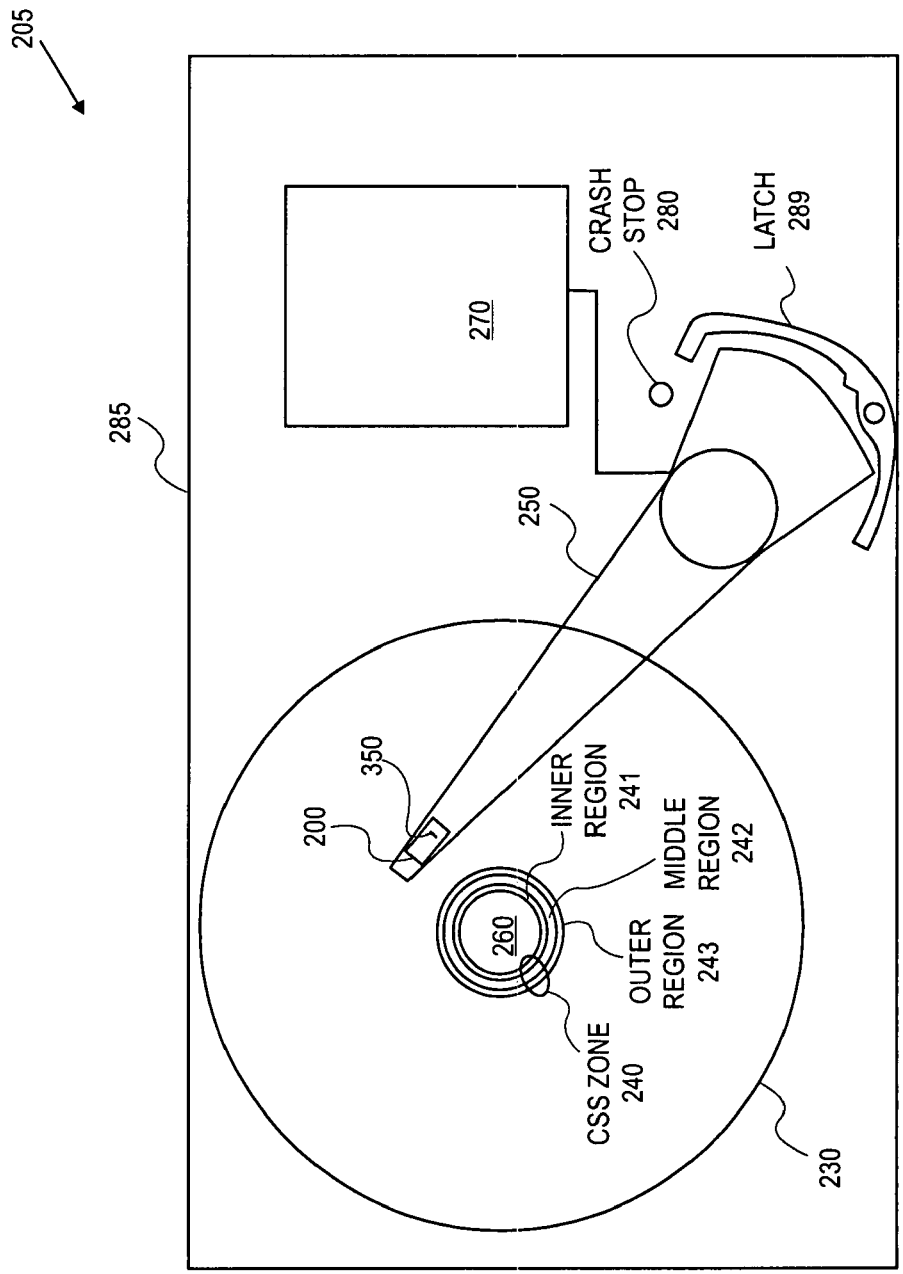
FIG. 2 illustrates one embodiment of a disk drive system having one embodiment of a head-disk interface.

FIG. 2 illustrates a disk drive having one embodiment of a head-disk interface. Disk drive 205 may include one or more disks, for example, disk 230 used to store data along tracks in a magnetic recording layer of the disk. Datum is read from and written to disk 230 using head 350 of slider 200. Head 350 includes both read and write elements. The write element is used to alter the properties of the longitudinal or perpendicular magnetic recording layer of disk 230. In one embodiment, head 350 may have a magneto-resistive (MR) and, in particular, a giant magneto-resistive (GMR) read element, and an inductive write element. In an alternative embodiment, head 350 may be another type of head, for example, a Hall effect head or an inductive head having a common element for both read and write operations.

Disk 230 resides on a spindle assembly 260 that is mounted to drive housing 285. The reading and writing of data is accomplished by flying slider 200 and, thereby, head 350 over the surface of disk 230 on a thin air bearing using a spindle motor (not shown) to rotate the spindle assembly 260 and, thereby, disk 430. The slider 200, on which head 350 is disposed, is attached to a suspension arm 250 via a gimbal assembly that load biases the slider 200 towards the disk 230. During startup, slider 200 is flown by rapidly rotating disk 230 to develop the air bearing between slider 200 and the surface disk 230. The airflow lifts slider 200 away from disk 230 in opposition to a loading force from the suspension arm 250. The net effect of the air bearing surface of slider 200 and the suspension arm 250 is to cause the slider 200 to fly at a desired height above disk 230 when the disk is rotating. An actuator moves suspension arm 240 and, thus, head 350 in a radial direction to a desired track on disk 230. The spindle motor rotates disk 230 to position head 350 at a particular location along the desired track. The position of head 350 is based on signals received from position control circuitry 270. The positioning of a head over a particular location on a desired track is well known in the art and, accordingly, a more detailed discussion is not provided herein.

The magnetic recording disk 230 includes a CSS zone 240 having an inner region 241, a middle region 242 and an outer region 243. During a shut down or stop, the suspension arm 250 is moved to position slider 200 over CSS zone 240 and then the slider 200 is landed on the CSS zone 240 surface of disk 230. As such, when disk drive 205 is not in operation or when the rotation of disk 230 stopping (or starting), slider 200 is in contact with the CSS zone 240 surface of disk 230.

Disk drive 205 may include a crash stop 280 (also referred to as a limit stop) for limiting motion of the suspension arm 250 to position head element 350 over the middle region 242 of CSS zone 240. In one embodiment, disk drive 205 may also include a latch mechanism 289 to secure suspension arm 250 such that head element 350 is in position over the middle region 242. Alternatively, the latch mechanism 289 may be integrated with crash stop 280. Various latch mechanisms (e.g., mechanical, magnetic, etc.) may be used. Latch mechanisms and crash stops are known in the art; accordingly a detailed discussion is not provided. The crash stop and/or latch mechanism is designed to restrict the movement of suspension arm 250 such that head 350 is positioned over the middle region 242 of CSS zone 240, resulting in a head-disk interface as discussed below.

Figure 3:
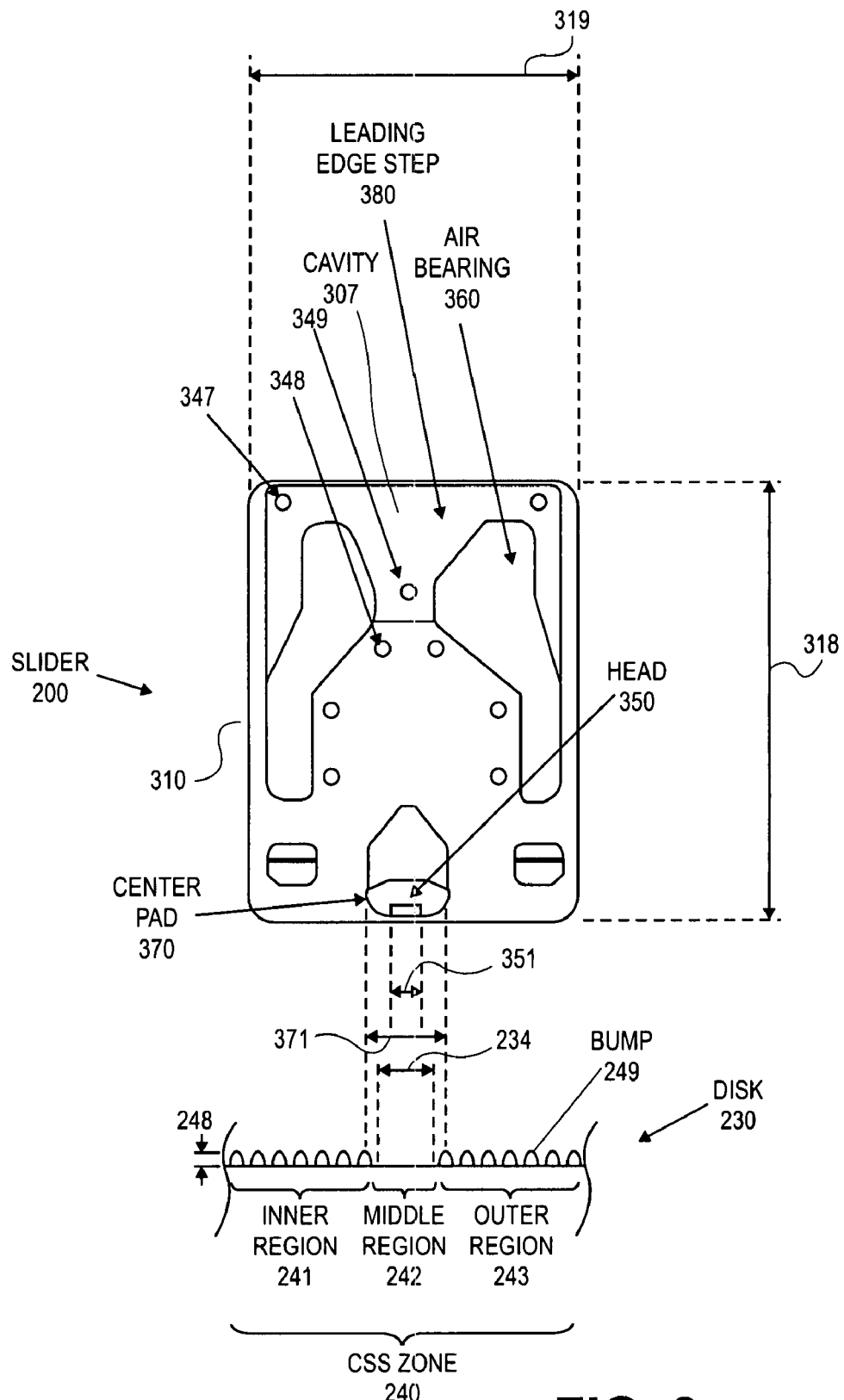
FIG. 3 illustrates one embodiment of a head-disk interface.

FIG. 3 illustrates one embodiment of a head-disk interface. Slider 200 includes a slider body 310, one or more protrusions (e.g., protrusion 347-349), head 350, and air bearing surface 360. The slider body 310 is attached to a suspension arm 250 of FIG. 2 via a head gimbal assembly that load biases the slider body 310 towards the disk 230. The net effect of the air bearing surface 360 and the suspension arm 250 is to cause the slider 200 to fly at a desired height above disk 230 when the disk is rotating. The air bearing surface 360 may include one or more rails or pads that generate a positive air pressure under slider 200. In addition, slider 200 may include a cavity 307 or similar structure between the rails that creates a sub-ambient pressure to counterbalance the positive pressure generated by suspension arm 250 of FIG. 2, to some extent.

In one embodiment, the head 350 may represent a MR (and, in particular, a GMR) read element and a separate inductive write element. Alternatively, head 350 may represent other types of head elements, for example, a Hall effect head or an inductive head having a common element for both read and write operations. In one embodiment, slider 200 may be a pico slider having, for example, a width 319 of approximately 1 millimeter (mm) and a length 318 of approximately 1.2 mm. Alternatively, slider 200 may be larger or smaller, for example, a femto or nano slider.

In one embodiment, head 350 is disposed on or adjacent a center pad, or rail, 370. Center pad 370 has a width 371 greater than the width 351 of head 350. Head width 350 represents a width of the widest read and/or write element in the head. The underside view of slider 200 is shown in FIG. 3 in relation to a cross section of disk 230 when head 350 of slider 200 is positioned over the middle region 242 of CSS zone 240. The CSS zone 240 is textured with bumps (e.g., bump 249) in the inner and outer regions 241 and 243. The bumps 249 may have a height 248 in approximately the range of 10-200 angstroms. Alternatively, bump 249 may have other heights. In one embodiment, the bumps may be laser induced bumps generated through LZT methods known to those of ordinary skill in the art. It should be understood that the invention is not limited to laser induced bumps. Rather, in alternative embodiments, other texturing methods (e.g., mechanical) well known to those of ordinary skill in the art may also be used. The size, number, and spacing of the bumps may vary based on the design of the slider and the CSS zone of the disk. Exemplary dimensions include a number of bumps in an approximate range of 50-500, diameters in an approximate range of 0.5-50 microns, and a bump spacing in an approximately range of 10-100 microns. The bumps reduce the area of contact (e.g., with air bearing 360 and/or one or more protrusions) with the slider 200, thereby reducing the stiction behavior of the slider 200 and disk 230 surface interface. Middle region 242 has bumps with a lower bump height, including a zero bump height (as illustrated in FIG. 3), than the bump height 248 of the bumps in inner region 241 and outer region 243. It should be noted that the middle region 242 may be otherwise exhibit surface features as a result of mechanical texturing of the substrate of the disk that is performed to produce a desired magnetic orientation in a magnetic film layer 150 ultimately residing on the disk in order to encourage preferred circumferential orientation of the magnetic media of magnetic recording layer. As such, middle region may 242 may not be, for example, laser textured but may have lower surface feature bumps as a result of such mechanical (or other form of) texturing.

The width 234 of the middle region 242 is designed to be less than the width 371 of the center pad 370 (where a center pad is used) such that the center pad 370 will be supported by the LZT bumps in the inner and outer regions during times when slider 200 is intended to be in contact with the disk 230, for example, disk rotation startup (beginning rotation of disk 230), shutdown and when the disk is at rest (when the head is parked on the disk). The width 234 of the middle region 242 is also designed to be greater than the width 351 of head 350 in order to avoid contact between the element(s) of head 350 and disk 230. In one embodiment, for example, head 350 may have a width 351 of 85 microns, center pad/rail 370 may have a width 371 of 350 microns, and middle region 242 may have a width 234 of 170 microns.

In an embodiment where the middle region 242 includes bumps having a lower height than the height 248 of the bumps in the outer and inner regions, the difference in bump heights is great enough to accommodate any extension of head 350 beyond the surface of center pad 370 so that head 350 will not contact the lower sized bumps in the middle region 242 during pitching and when slider 200 is intended to be in contact with inner and outer regions 241, 243. Such head extension may be, for example, on the order of a few nanometers.

By generating a middle region of the CSS zone, configured to reside directly beneath a head, to have bumps with lower, including substantially zero, (e.g., no bumps generated), height than bumps in inner and outer contact regions of the CSS zone, contact with the head during CSS operations can be prevented while the bump height in the inner and outer contact regions of the CSS zone can be optimized based on stiction requirements.

It should be noted that the apparatus and methods discussed herein are not limited to only a head utilizing a center pad as illustrated in FIG. 3. Rather, the apparatus and methods discussed herein may be used with sliders that utilize rails/pads disposed on each side of a head element.

Referring again to FIG. 2, in order to increase the storage capacity of the disk, the inner diameter (ID) region on the disk 230 may be used for the CSS zone 240. With the CSS zone 240 positioned at the ID of disk 230, the areas near the outer diameter of disk 230 may be used to store data. Suspension arm 250 is required to traverse to the OD of disk in order to position head 350 at such OD areas. The stroke length is the distance that the suspension arm 250 travels from the OD to the ID areas of the disk. A long stroke length results in a skew angle of the head 350 relative to a track line on the disk as head 350 moves in a radial direction from the outer diameter of the disk to the CSS zone. This skew angle changes not only the profile of the head 350 relative to data tracks but also the profile of head 350 relative to the middle region 242 of the CSS zone, as illustrated in FIG. 4.

Figure 4:
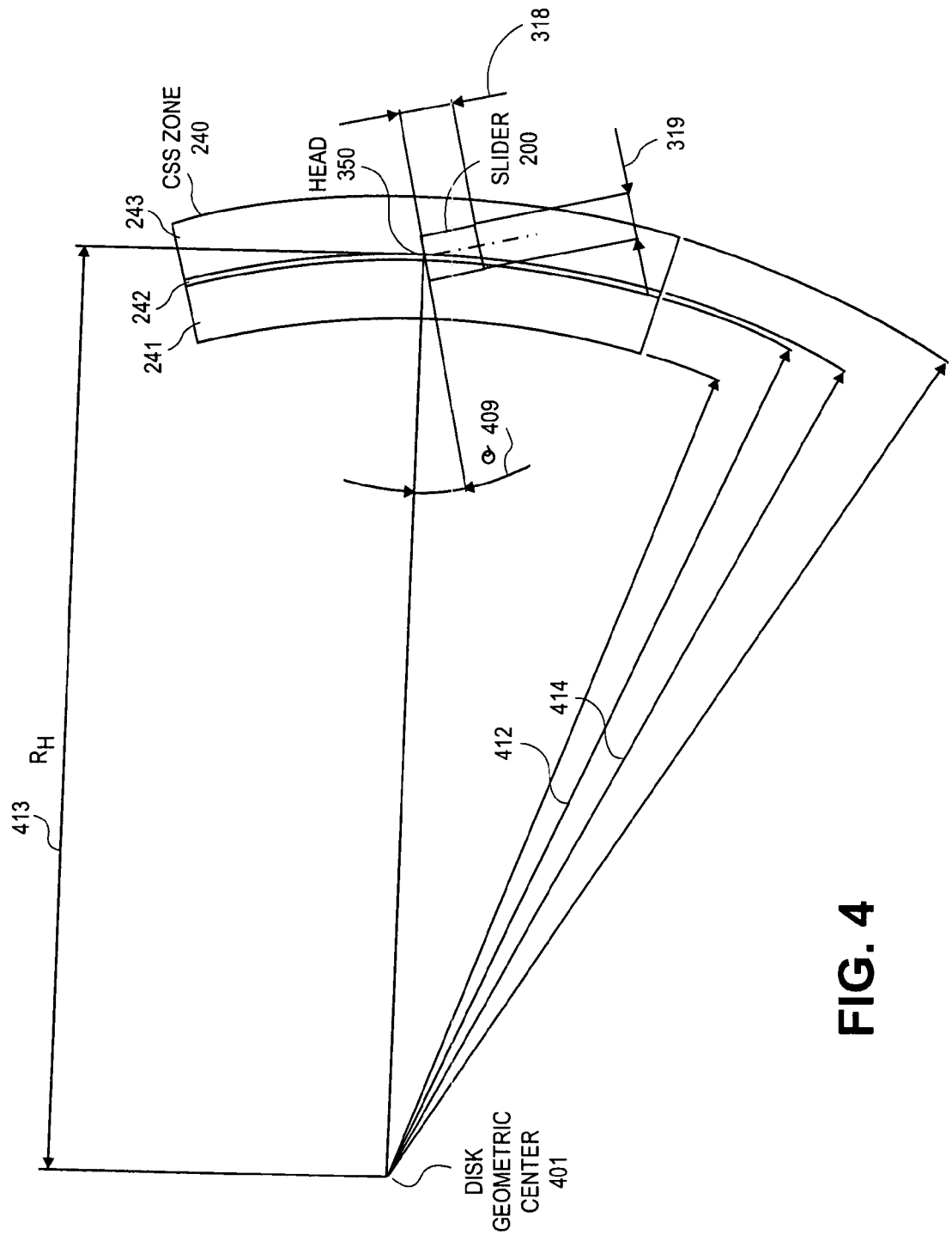
FIG. 4 illustrates one embodiment of a head-disk interface with inner diameter head skew.

FIG. 4 illustrates an example of slider position with inner diameter position skew. This figure embodiment provides an illustrative example of head skew based on the radial distance of head 350 from the geometric center 401 of disk 230. In this example, the middle region 242 of CSS zone 240, over which head 350 is positioned for CSS operations, extends from a radial (R) distance 412 (e.g., 18.95 mm) to a radial distance 414 (e.g., 19.05 mm). Head 350 is positioned over middle region 242 at a radial distance 413 (e.g., 19 mm) there between. At radial distance ($R_H$) 413 at which head is positioned for CSS operations, head 350 may have a skew angle ($\theta$) 409 (e.g., approximately 12 degrees). In one embodiment, the width 234 of the middle region 242 may be designed to accommodate the effective width of the head 350, with respect to the radial distance 413 at which head 350 is positioned, due to the skew angle ($\theta$) 409 of the head 350 by designing the width 234 of the middle region to be greater than the width 351 of the head element 350 multiplied by cosine $\theta$. For a typically drive, the skew angle 409 may be expected to be in an approximate range of 10 degrees to 22 degrees. However, head skew angles outside this range may also be accommodated.

Figure 5:
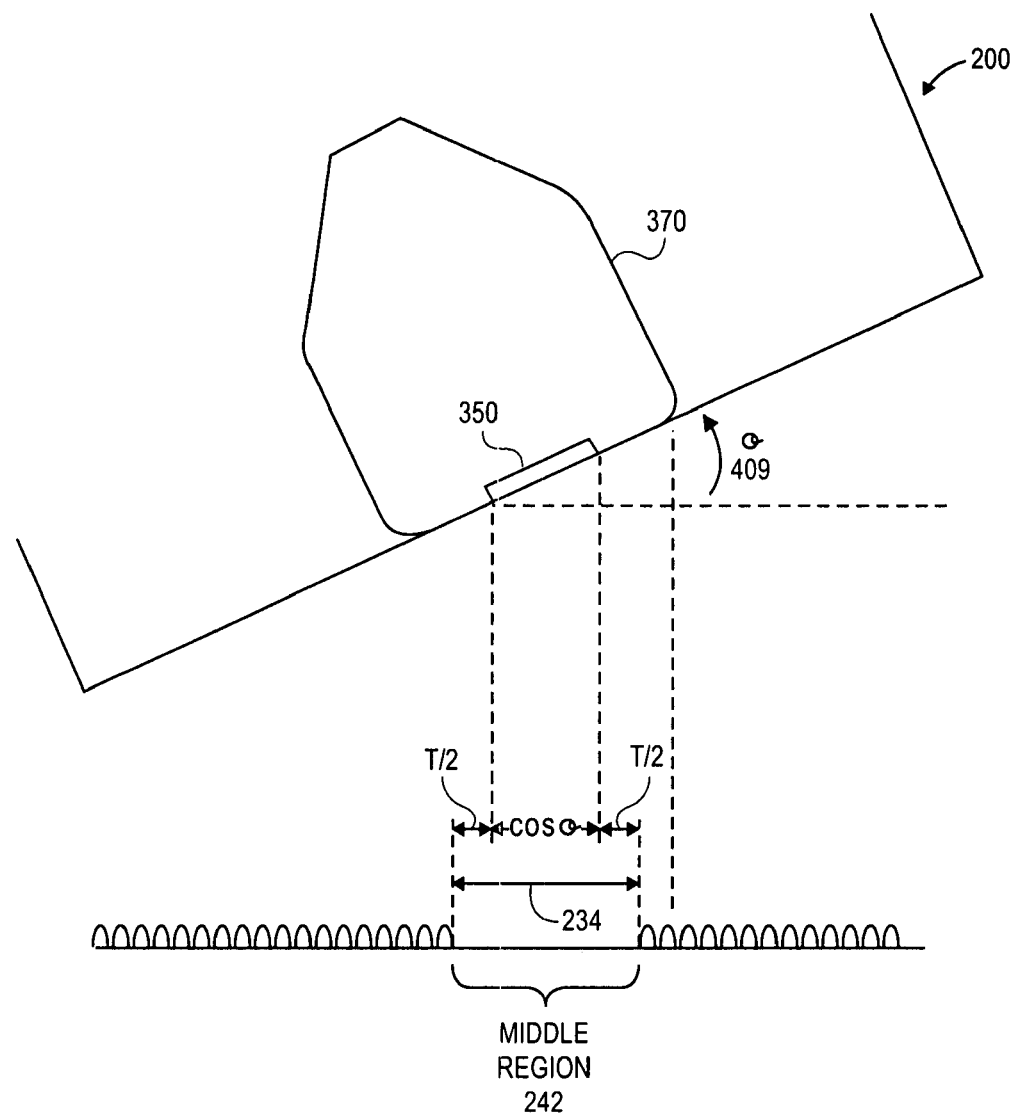
FIG. 5 illustrates one embodiment of a head-disk interface with head skew and position tolerance.

In another embodiment, the width 234 of middle region 242 may designed by factoring in the tolerance (T) in the head element 350 position based on the design of the crash stop 280 and/or latch mechanism. Although the crash stop 280 and/or latch mechanism is designed to restrict the movement of suspension arm 250 such that head 350 is positioned over the middle region 242, such components may not be able to retain suspension arm 250, and thereby head 350, in the same exact position each time the drive is started/stopped. This results in some tolerance (T) in head element 350 position based on the design of the crash stop 280 and/or latch mechanism which is illustrated in FIG. 5 as T/2 on each side of head 350. In one embodiment, middle region 242 may be widened to accommodate this tolerance by designing the width 234 of middle region 242 to be greater than T (=T/2+T/2) plus the width 351 of head 350. The tolerance for a disk drive system may be determined by various means, for example, simulation, empirical data, etc. The middle region 242 may be designed to account for both the skew angle 409 and tolerance as illustrated in FIG. 5. Alternatively, the middle region 242 may be designed to account for only one of the skew angle 409 and the tolerance T. In an embodiment that accounts for head skew, the width 234 of the middle region 242 may also be designed to be less than the width 371 multiplied by a cosine of the skew angle 409.

Although disk drive 205 is illustrated and discussed in the context of a single side of a single disk 230 for ease of explanation, disk 230 may be a double sided disk and disk drive 205 may include multiple disks (single sided and/or double sided) in which one or both sides of a disk may have a corresponding head and suspension arm with a disk-head interface as discussed herein. Furthermore, although the disk drive 205 is illustrated and discussed in relation to air bearing sliders, the apparatus and methods discussed herein may be applied to disk drive systems utilizing contact or near contact recording head technology.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A disk drive, comprising:
    a slider comprising a head element having a first width; and
    a magnetic recording disk comprising a contact-start-stop (CSS) zone having an inner region, and outer region, and a middle region, wherein the middle region includes surface features having a first height being lower than a second height of surface features of the inner and outer regions, wherein the head element has a skew angle with respect to the middle region, and wherein the middle region has a second width being greater than the first width of the head element multiplied by a cosine of the skew angle.

2. The disk drive of claim 1, wherein the head element is at least one of a read element and a write element.

3. The disk drive of claim 2, wherein the read element utilizes magneto resistance.

4. The disk drive of claim 1, wherein the head element is a Hall element.

5. The disk drive of claim 1, wherein the first height of the surface features in the middle region is substantially zero.

6. The disk drive of claim 5, wherein the surface features of the inner and outer regions are laser textured bumps and wherein the middle region has no laser textured bumps.

7. The disk drive of claim 6, wherein the slider further comprises a center pad having a third width, and wherein the second width of the middle region is less than the third width of the center pad multiplied by the cosine of the skew angle.

8. The disk drive of claim 7, wherein the second width of the middle region is greater than the first width of the head element.

9. The disk drive of claim 8, wherein the second width of the middle region is less than the third width of the center pad.

10. The disk drive of claim 1, wherein the slider further comprises a center pad having a third width, and wherein the second width of the middle region is less than the third width of the center pad multiplied by the cosine of the skew angle.

11. The disk drive of claim 10, wherein the second width of the middle region is greater than the first width of the head element and less than the third width of the center pad.

12. The disk drive of claim 11, further comprising:
    a suspension arm, wherein the slider is coupled to the suspension arm;
    a crash stop to limit movement of the suspension arm and provide a position for the head element of the slider above the middle region of the CSS zone when the magnetic recording disk is at rest; and
    wherein the second width of the middle region is greater than the first width of the head element multiplied by the cosine of the skew angle plus a design tolerance of the position of the head element.

13. The disk drive of claim 12, wherein the head element is a magneto resistive (MR) read element.

14. The disk drive of claim 1, wherein the second width of the middle region is greater than the first width of the head element.

15. The disk drive of claim 1, further comprising:
    a suspension arm, wherein the slider is coupled to the suspension arm;
    a crash stop to limit movement of the suspension arm and provide a position for the head element of the slider above the middle region of the CSS zone when the magnetic recording disk is at rest; and
    wherein the second width of the middle region is greater than the first width of the head element multiplied by the cosine of the skew angle plus a design tolerance of the position of the head element.

16. The disk drive of claim 1, wherein the slider further comprises a plurality of pads and wherein the second width of the middle region of the CSS zone on the magnetic recording disk is less than a minimum distance between two of the plurality of pads disposed on opposite sides of the head element.

17. The disk drive of claim 1, wherein the second width of the middle region is approximately in a range of 50 microns to 400 microns.

18. The disk drive of claim 6, wherein the second width of the middle region is approximately in a range of 50 microns to 400 microns.

19. The disk drive of claim 7, wherein the second width of the middle region is approximately in a range of 50 microns to 400 microns.

20. A disk drive, comprising:
    a magnetic recording disk, comprising:
        a contact-start-stop (CSS) zone having an inner region, an outer region and a middle region, wherein the inner and outer regions have a laser texture and wherein the middle region has no laser texture, and wherein the middle region has a first width;
    a slider in contact with CSS zone of the magnetic recording disk when the magnetic recording disk is at rest, the slider comprising:
        a head element being Hall effect element or a magneto-resistance read element, the head element having a second width and a skew angle; and
        a center pad having a third width, wherein the first width of the middle region of the CSS zone is greater than the second width of the head element multiplied by a cosine of the skew angle, and wherein the first width of the middle region is less than the third width of the center pad.

21. The disk drive of claim 20, wherein the first width of the middle region of the CSS zone is greater than the second width of the head element.

22. The disk drive of claim 20, wherein the first width is approximately in a range of 50 microns to 400 microns.

23. The disk drive of claim 20, wherein the skew angle is approximately in a range of 10 degrees to 22 degrees.

24. The disk drive of claim 20, further comprising:
    a suspension arm, wherein the slider is coupled to the suspension arm;
    a crash stop to limit movement of the suspension arm and provide a position for the head element of the slider above the middle region of the CSS zone when the magnetic recording disk is at rest; and wherein the second width of the middle region is greater than the first width of the head element multiplied by the cosine of the skew angle, plus a design tolerance of the position of the head element.

25. A disk drive, comprising:

a slider having a head element and a center pad; and means for maintaining the head element out of contact with a surface of a contact-start-stop (CSS) zone of a magnetic recording disk and maintaining the center pad in contact with a part of the CSS zone having surface features while beginning to rotate the magnetic recording disk.

26. The disk drive of claim 25, wherein the means for maintaining comprise a predetermined relationship between a center pad width and a width of a region on the CSS zone having a different texture or no texture relative to other regions on the CSS zone.

27. A method of operating a disk drive, comprising:

parking a slider on a magnetic recording disk, wherein the slider comprises first and second side rails, a center rail and a head element, and wherein the magnetic recording disk comprises a contact-start-stop (CSS) zone having an inner region, and outer region, and a middle region, wherein the middle region includes surface features having a first height being lower than a second height of surface features of the inner and outer regions to form a recess therein;

beginning to rotate the magnetic recording disk; and preventing the center rail from dropping into the recess while beginning to rotate the magnetic recording disk.

28. The method of claim 27, wherein parking further comprises positioning the head element above the recess of the middle region.

29. The method of claim 27, further comprising maintaining contact between the first and second side rails and the inner and outer regions, respectively, while beginning to rotate the magnetic recording disk.

30. The method of claim 27, wherein preventing comprises maintaining contact between the center rail and at least one of the inner and outer regions while beginning to rotate the magnetic recording disk.

* * * * *